April 26, 1938.  S. VERNET  2,115,501
THERMOSTAT
Filed Oct. 1, 1934  2 Sheets—Sheet 1
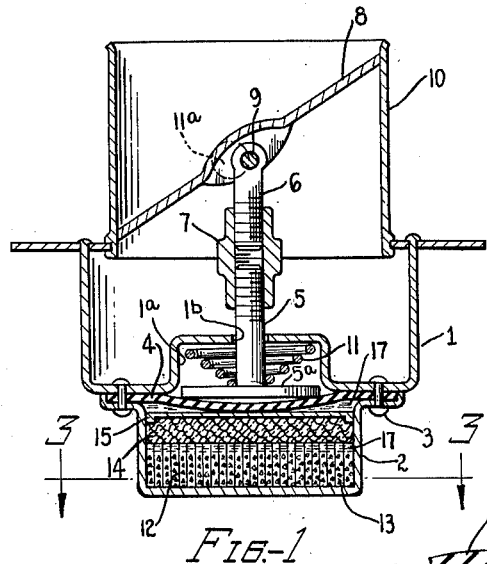
Fig.-1
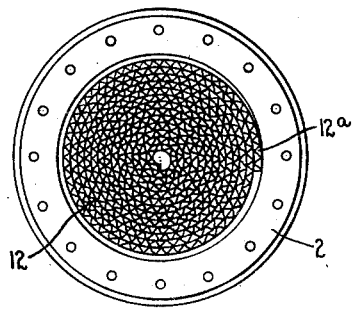
Fig.-2
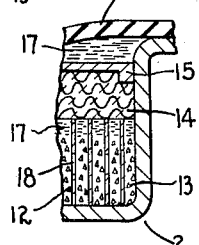
Fig.-4
Fig.-3
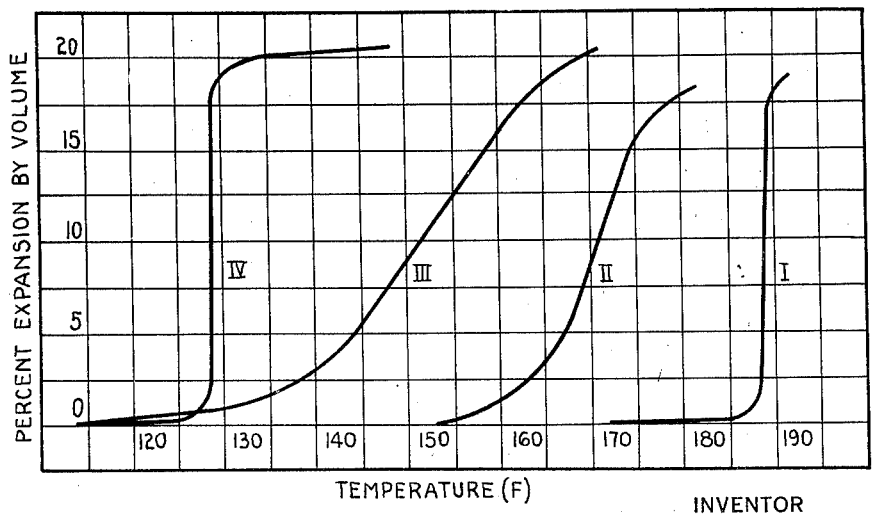
Fig.-5
INVENTOR
Sergius Vernet
BY
Andrew K. Foulds
his ATTORNEY April 26, 1938.                    S. VERNET                      2,115,501
                                  THERMOSTAT
                              Filed Oct. 1, 1934              2 Sheets-Sheet 2

INVENTOR
BY Sergius Vernet
ATTORNEY

Patented Apr. 26, 1938

2,115,501

UNITED STATES PATENT OFFICE 2,115,501

THERMOSTAT

Sergius Vernet, New York, N. Y., assignor to Vernay Patents Company, Dover, Del., a corporation of Delaware Application October 1, 1934, Serial No. 746,460

26 Claims. (Cl. 297—3)

This invention relates to new and useful improvements in control devices and more particularly to a device responsive to temperature and operable to actuate certain controlling means.

One object is to provide a device having positive and accurate response over a predetermined temperature range.

Another object is to provide a device which will have in its desired temperature operating range a high coefficient of expansion but which will have a minimum of expansion outside said range.

Another object is to provide a structure by which the forces created by temperature change will be fully and efficiently transmitted to the controlling means.

Another object is to provide means for rapidly and uniformly subjecting the responsive means to variation of temperature.

Another object is to provide means for securing a minimum deviation of the thermal expansion and contraction characteristics of the temperature responsive means and particularly within the desired operating range.

The invention also relates to that class of thermostatic devices wherein crystalline material is made to undergo modification within preassigned volume-temperature limits and preferably in the presence of a non-modifying non-solvent intimately associated therewith and acting as the integrating medium for the contributory pressures of the elementary mass particles whether in distinctly crystalline or substantially fused state.

While the non-modifying non-solvent may be a solid, such for instance as pulverized quartz or carbon, it is preferably a liquid for facility and smoothness of operation and is preferably under a normal minimum pressure sufficient to insure penetration and continued intimacy of contact with the crystalline material.

Another object is to provide means by which the modifying crystalline material or medium will not be subject to stratification, separation or other related phenomena which might alter or change its original volumetric characteristics.

Another object is to provide means for localizing or holding and maintaining the modifying crystalline material in allocated position or a given region irrespective of change in position or normal handling and usage.

The invention consists in the particular control device, the combination of elements and the elements, to be more fully described hereinafter and the novelty of which will be particularly pointed out and distinctly claimed.

In the accompanying drawings, to be taken as a part of this specification, I have fully and clearly illustrated my invention, in which drawings—

Figure 1 is a view in vertical central section of one embodiment of this invention, and represents one design of control device suitable for regulating the flow of cooling water in motor cars;

Fig. 2 is a detail plan view of a certain cup or container member with certain of the contained elements removed for clarity, and showing one form of retaining means;

Fig. 3 is a detail view in section on the line 3—3 of Fig. 1, but showing another form of retaining means;

Fig. 4 is an enlarged detail view in vertical section of certain of the structure of Fig. 1.

Figure 5:
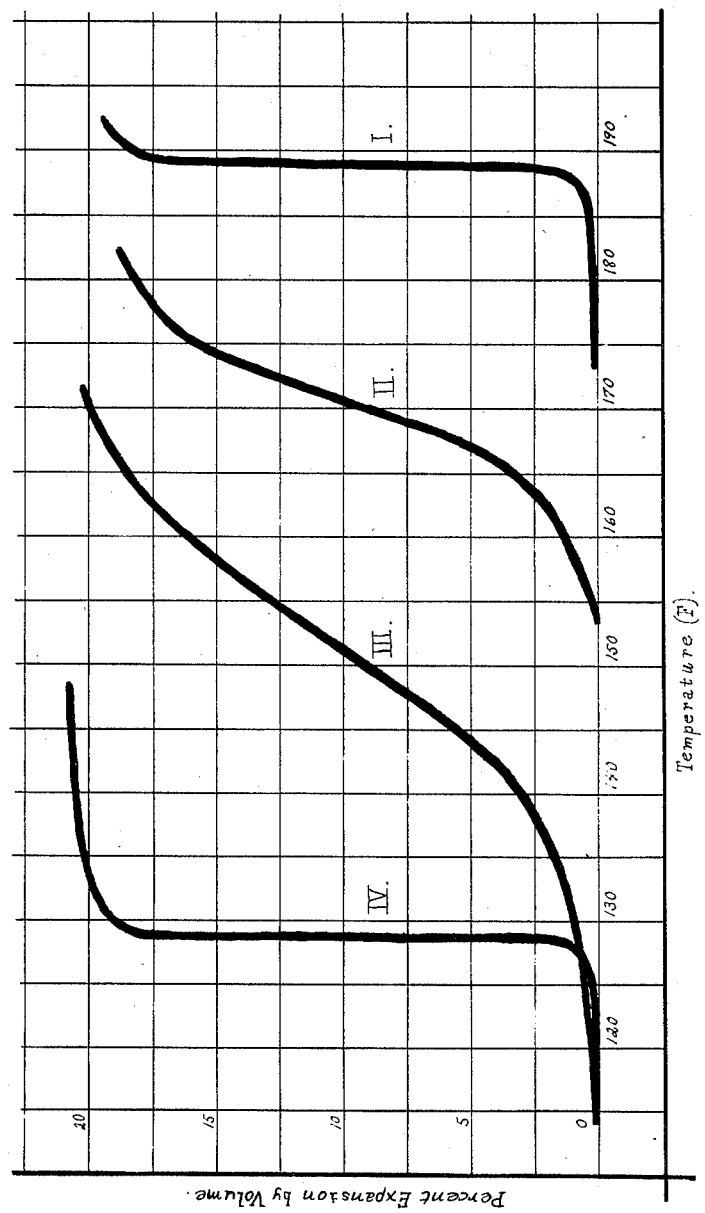
Fig. 5 is a graph of response characteristics obtainable by my invention.

In the embodiment shown in Fig. 1, the thermostat or control device comprises a cover or closure member 1 having an end wall attached to a cup or container member 2 and preferably rigidly secured thereto by means of the rivets 3. Clamped and sealed at its periphery between the end wall of cover 1 and a lateral circumferential flange at the top edge or rim of the container or receptacle 2 and sealing the open top of the container, there is a pressure responsive means such as a flexible diaphragm 4 made of rubberized fabric or any other suitably treated material or combination of materials. The cover 1 has in its end wall a central recess or chamber 1ª having its open side facing the diaphragm 4 and is centrally apertured, as at 1ᵇ. Positioned in and extending through the aperture 1ᵇ there is a plunger or piston 5 connected to an alined shaft 6 by a sleeve nut 7. The shaft 6 is pivotally secured to a valve or vane 8, preferably a plate or disc of the butterfly type, by a pivot pin 9. The vane 8 is located in a conduit or sleeve 10 preferably concentric with shaft 6 and rigidly secured to and in communication with the interior of cover 1. Within the recess 1ª there is a spring 11, held under compression between the cover 1 and the head 5ª of the piston 5 and which tends to keep the vane 8 in the fully closed position. The valve or vane 8 is pivotally supported in the wall of the sleeve or conduit 10 by bearing means 11ª such as trunnions. A crystalline material 13 is located in the bottom portion of the cup 2, and is contained in the cellular structure of the fins 12 which are preferably formed by a coiled metal ribbon. Overlying the crystalline material and filling the cavities between the separate crystals or groups of crystals within the fins there is a force transmitting liquid 17. This liquid also fills the space in the container 2 between the crystalline material 13 and the diaphragm 4 so that expansion of the material will be transmitted by the liquid to the diaphragm. Porous felt material 14 is located above the fin structure 12 and is pressed firmly down upon it by the perforated plate 15 which is fixed in position in the container in any suitable manner.

The operation of the device starting from the closed position is as follows: A rise in temperature of the unit to the fusing point of the crystalline material 13 will cause the latter to change from the solid to a liquid state with an accompanying change in volume. Materials expanding while entering their liquid state such as paradichlorobenzene, paradibromobenzene, cyclohexane, are suitable for this purpose. The liquid 17 will first be displaced from the minute spaces between the crystals. This change in volume will be transmitted by the liquid 17 to the diaphragm 4, which will then be pushed up toward the piston 5. As the crystals continue to fuse, the change in volume will become greater, and the liquid 17 will continue to force the diaphragm 4 against the piston 5 until said piston 5 is moved in a vertical direction, thereby changing the position of the vane 8. This action will continue until the crystalline material 13 has entirely fused. The piston 5 will then have moved the vane 8 to open position. Increase in temperature occurring after total fusion will occasion only a relatively small amount of expansion resulting in a negligible movement of the vane 8. The boiling points of the crystalline and liquid materials used are sufficiently high to prevent vapor from being formed under all operating conditions.

A decrease in temperature sufficient to cause the crystallization of the material 13 will result in a corresponding change in volume. The tension of the spring 11 acting upon the piston 5 will move the vane 8 towards its closed position. The full crystallization of the material 13 will allow the diaphragm 4 to recede slightly from the piston head 5ª to its position, Fig. 1, after the vane 8 has closed completely. This clearance is desirable to eliminate the effects of the slight expansion occurring in the various materials prior to a change in state.

Crystalline materials serviceable for thermostats are usually poor heat conductors, and if used in one unbroken mass, cause such lag in operation as to render the unit impractical for many purposes. The heat conducting fin structure 12 is in thermal contact with the walls of cup 2 and acts to rapidly and uniformly conduct external temperature changes to the modifying materials within the unit.

Damage to the diaphragm 4 may be caused by the crystalline material 13 coming in contact with it, either through chemical action or by the prevention of its proper flexing due to the crystals tending to form around its outer edge and upon its surface. The felt material 14 and the perforated disc 15 cooperate to localize the crystalline material 13, thereby preventing it from coming in contact with the diaphragm 4. Other and additional protective means such for instance as a cupped impervious auxiliary diaphragm might also be included between the main diaphragm 4 and the perforated plate 15. The closely spaced fins 12, by the creation of capillary forces and by their baffling effect, also cooperate to localize the crystalline material 13. It is thus possible to shake or even tip the unit considerably without displacing the material 13 from its original position.

Solid solutions or other crystalline substances used as modifying materials in thermostats of the type described are apt to separate or stratify when repeatedly submitted to temperatures high enough to cause only their partial fusion. These and other related phenomena modify the original volumetric characteristics of the crystalline materials, thereby affecting the calibration of the thermostat. The use of the shallow cup 2 and the location of the crystalline material 13 in the capillary chambers and spaces of the fin structure 12 reduce this tendency to a minimum since the crystalline material 13 is uniformly heated throughout, and the liquid fraction resulting from partial fusion is retained in its original relation to the remaining crystals by the exertion of capillary forces.

Supercooling of the crystalline materials is minimized by the use of the felt material 14. A few crystals become lodged in the felt material where they are not so readily subjected to changes in temperature. They therefore are not fused as quickly as the main mass of crystals located in the fin structure 12. When the temperature drops sufficiently, they act as nuclei from which crystallization is propagated throughout the entire mass. Among the cooperative materials found useful for minimizing supercooling may be mentioned activated charcoal, granulated quartz, and carborundum crystals. In general, initiating crystals having complex, complementary, or corresponding structures to the modifying crystalline morphologically transformable materials used, and characterized by a low thermal coefficient of expansion, are preferred. The choice of initiating or phase-change crystals may be made on one further and important consideration: When modifying or morphologically transformable material or crystals of any one type are gradually fused, a transformation of the crystal pattern to one tending to persist even in quasi-dissolved or quite possibly also in totally fused state is evidenced. It is this latter pattern which is the more important in the selection of phase-change catalysts, be they crystalline or otherwise since initiation of solidification is more readily brought about when the crystal pattern of the catalyst conforms the more nearly to the pattern of the fused or partially fused modifying crystalline material.

The fin structure 12 may be made up of a corrugated piece of metal, the piece preferably being an elongated ribbon or strip of thin sheet metal which is spirally coiled, as shown. Due to the undulations or corrugations in the strip, contiguous turns provide separate chambers 12ª which extend longitudinally of the cup 2 and communicate with each other across the top and bottom or ends of the coil so that the chambers are not sealed completely from each other. Crystals remaining in any one of the chambers act as nuclei from which crystallization will be propagated throughout the entire mass. To augment and enhance the effectiveness of this tendency of propagation, the metal strip forming the fin structure 12 may be pierced or apertured to provide holes 18 establishing intercommunication between the various chambers 12ª intermediate the top and the bottom or ends of the structure 12, as shown in Fig. 4. While a corrugated ribbon provides one of the simplest modes of obtaining the chambered or cell structure of Fig. 2, the double operation of perforating and corrugating may be dispensed with, and a ribbon having a sequence of louvers or bent-out and preferably tapering tongues utilized.

As already indicated, unless the non-modifying liquid is under a normal minimum of pressure sufficient to insure penetration and continued intimacy of contact with the crystalline material during its fused or partially fused state, loss of calibration will result as the modifying material may even present an unbroken solidified surface to the overlying liquid and thereby exclude from its interstices a quantity of the force transmitting overlying liquid. In the embodiment of Fig. 1, calibration is maintained by the residual pressure action of the spring 11 and piston 5 on the diaphragm 4 since the spring force transmitted by the diaphragm to and equally throughout the overlying liquid injects the liquid into the crevices and interstices of the modifying material as it solidifies. The localizing of the modifying material 13 in the fin structure 12 and shallow cup 2 is particularly helpful as the depth of the cup is a criterion of constant and uniform response, too great a depth preventing proper penetration of the overlying liquid. The material 13 when crystallizing from the liquid state, if contracting, leaves openings along the sides of the coil convolutions and may also leave craters or voids in the material intermediate or between adjacent turns of the coil, thus allowing freer access to the liquid 17 under the force of spring 11.

Penetration among the crystals and into the interstices in the modifying material is improved by using a low viscosity force transmitting liquid or material such as water, kerosene, benzene, or ether. For a preassigned operating range, the main factors governing choice of liquid are: (1) chemical stability, (2) phase stability, (3) viscosity curve, (4) expansion curve. Characteristic (2), i. e. phase stability, represents the essential difference between the "modifying" and the "non-modifying" materials utilized. The characteristics (3) and (4), while possibly varying over a wide range, are nevertheless so combined in the several materials used as to produce the over-all response characteristic desired.

With most crystalline materials, the temperature rate of change in volume ($dv/dT$) is inappreciable except in the immediate and narrow region of phase conversion. Curves I and IV of Fig. 5 roughly illustrate this feature with two different substances, paradibromobenzene and paradichlorobenzene respectively.

It has been found that by making a mixture of two or more such substances in varying proportions and treating same as one mass, intermediate response characteristics with considerably more inclined S curves are obtainable. Thus, with percentages by weight, curve II represents 85% paradibromobenzene and 15% paradichlorobenzene, and curve III represents 70% paradibromobenzene and 30% paradichlorobenzene. It is evident that in this fashion the temperature range over which substantial change in volume of the modifying crystalline material occurs may be controlled, and desirable linear response over said range substantially obtained.

When widely different temperature ranges are desired, different materials are of course utilized. Thus, for the range of temperatures required in refrigerators, water coolers, air conditioners, and the like, one suitable combination is paradichlorobenzene and cyclohexane. The non-modifying material and phase-catalysts must also be correspondingly chosen. As already pointed out, in general it will be found convenient to use a non-modifying liquid which is also a non-solvent of the phase-catalysts and modifying materials employed. It may however be a partial solvent of the phase-catalysts, and may contain in dissolved form various amounts of other materials; all materials so combined and proportioned as to produce the over-all response characteristic desired.

The term "morphologically transformable" or the like as used herein and in the appended claims is defined as "a volumetric change or volumetrically alterable due to change in structure and/or of or in phase".

Having now set forth the object and nature of my invention, and described instrumentalities embodying the principles thereof and illustrated the method pertaining thereto, what I claim as new and useful and of my own invention and what I desire to secure by Letters Patent is:

1. In a thermostatic device, a force transmitting material which is liquid and non-volatile in the operating range, and a second material cooperable with said first material and morphologically transformable in the operating range, said second material being non-soluble in said first material and being characterized by the formula $$C_zH_yR_x$$

where $x+y=nz$, $n$ is an integer, and R is some element not carbon.

2. In a thermostatic device, a modifying organic crystalline material, a second and non-modifying material intimately associated with and a non-solvent of said first-named material and acting as the integrating medium for the contributory pressures of the elementary mass particles of said first-named material, and a third material cooperating with said first-named material as a phase-change medium.

3. In a thermostat, a pressure creating temperature responsive means comprising a plurality of combined organic morphologically transformable crystalline materials, said materials being in predetermined proportional relationship to control the temperature of transformation of said combined materials, one of said materials having its transformation below the operating range of said means, and another of said materials having its transformation above the operating range of said means.

4. In a thermostatic device, a pressure creating modifying organic crystalline material, a force transmitting material which is liquid and non-volatile in the operating range cooperable with said first-named material, and a phase-change medium having the crystal pattern of the partially fused modifying crystalline material whereby solidification is aided and super-cooling is substantially avoided.

5. In a thermostatic device, a temperature responsive element comprising a capillary fin structure, and a material morphologically transformable in the operating range of said device and substantially localized in the structure, said structure serving to subdivide the material to render said material accurately responsive to temperature change.

6. A thermostatic device including a movable control element, a chamber, an organic crystalline material morphologically transformable within the operating range and contained in said chamber, a non-modifying liquid in intimate contact with said crystalline material and cooperating with said control element.

7. A thermostatic device including a movable control element, a chamber, crystalline material morphologically transformable within the operating range and contained in said chamber, and a force transmitting non-modifying liquid under pressure during the transformed state of and in intimate contact with said crystalline material and cooperating with said control element.

8. A thermostatic device including a movable control element, a chamber, a heat conducting capillary structure in said chamber, crystalline material in said chamber in heat transfer relation to said structure and morphologically transformable within the operating range, and a force transmitting non-modifying liquid in intimate contact with said crystalline material and cooperating with said control element.

9. A thermostatic device including a movable control element, a chamber, crystalline material morphologically transformable within the operating range, a non-modifying liquid in intimate contact with said material and operable to transmit force therefrom to said element, and means maintaining such contact between said crystalline material and said non-modifying liquid during the transformed state of said material.

10. A thermostatic device including a movable control element, a chamber, crystalline material morphologically transformable within the operating range and contained in said chamber, non-modifying liquid in intimate contact with said crystalline material and operable to transmit force therefrom to said element, and means cooperating with and acting to localize said crystalline material in said chamber.

11. A thermostatic device including a movable element, a chamber having a portion of its wall defined by said element, morphologically transformable crystalline material in said chamber and operable upon transformation to actuate said element, means to transmit the force of said material to said element, and capillary means in said chamber receiving said material and acting to retain said material localized.

12. A thermostatic device including a movable element, a chamber having a portion of its wall defined by said element, organic crystalline material morphologically transformable within the operating range positioned in said chamber and operable upon transformation to actuate said element, and means retaining a portion of said material segregated from the main body of material to minimize super-cooling of said material.

13. A thermostat comprising an organic crystalline material morphologically transformable in the operating range, and means cooperating with said material to assure the transformation occurring at a substantially unvarying temperature or temperatures.

14. A thermostat containing as actuating means an organic material morphologically transformable within the operating range, and a second material liquid and non-volatile in the operating range cooperable with the first-named material and operable to transmit force created thereby.

15. In a thermostat, a pressure creating temperature responsive means comprising a mixture of paradibromobenzene and of paradichlorobenzene in predetermined proportional relationship to control the temperature of response of said means.

16. A thermostat comprising a container, a heat transmitting cell structure in said container, a crystalline morphologically transformable material in said structure, means substantially impervious to said material and overlying and maintaining said material in said structure, a force transmitting liquid passed by said means, and a movable element closing a portion of said container and actuated by said liquid.

17. A thermostat comprising a container, a heat transmitting cell structure in said container, a crystalline morphologically transformable material in said structure, means substantially impervious to said material and overlying and maintaining said material in said structure, a force transmitting liquid passed by said means, means maintaining said liquid under pressure during transformation of said material, and a movable element closing a portion of said container and actuated by said liquid.

18. A thermostat comprising a container, a heat transmitting cell structure in said container, a crystalline morphologically transformable material in said structure, an element substantially impervious to said material and overlying and maintaining said material in said structure, a perforate member holding said element in position, a force transmitting liquid passed by said element and by said perforate member, and a movable element closing a portion of said container and actuated by said liquid.

19. In a thermostat, a container, a sheet material coil of heat transmitting material in said container and establishing a fin structure, and a morphologically transformable crystalline material positioned in said structure, said structure serving to subdivide said material and to transfer temperature change to the subdivided material to render the material accurately responsive to temperature change.

20. In a thermostat, a temperature responsive means including an organic force exerting crystalline material morphologically transformable in the operating range, and a second material of substantially constant characteristic in the operating range in intimate contact with said means and operable to transmit the force exerted on transformation by said crystalline material.

21. A thermostat comprising a container, a cellular member in said container, crystalline material carried in the cells of said member and morphologically transformable on temperature change, means holding said member in position in said container, a movable element defining a portion of the wall of said container, and a force transmitting medium in said container, said medium acting to transmit the expansive force of said material on transformation to said element.

22. A thermostat comprising a container, a cellular member in said container, crystalline material carried in the cells of said member and morphologically transformable on temperature change, means holding said member in position in said container, a movable element defining a portion of the wall of said container, and a force transmitting liquid in said container, said liquid being non-volatile in the operating range of said material and acting to transmit the expansive force of said material on transformation to said element.

23. A thermostat comprising a container, a cellular member in said container, crystalline material carried in the cells of said member and morphologically transformable on temperature change, means holding said member in position in said container, a movable element defining a portion of the wall of said container, a force transmitting liquid in said container, said liquid being non-volatile in the operating range of said material and acting to transmit the expansive force of said material on transformation to said element, and means maintaining said liquid under pressure during transformation of said material.

24. A thermostat comprising a cup-shaped container having an open side, a diaphragm member closing and sealing said open side, a cellular member positioned in said container in intimate heat exchange relation to the wall thereof, crystalline material carried in the cells of said member and morphologically transformable upon temperature change, means holding said cellular member in position in said container, and a force transmitting liquid in said container, said liquid being non-volatile in the operating range of said material and acting to transmit the expansive force of said material on transformation to said diaphragm member.

25. A thermostat containing as actuating means an organic material morphologically transformable within the operating range, a second material liquid and non-volatile in the operating range cooperable with the first-named material and operable to transmit force created thereby, and a metallic heat transmitting member in heat exchange relation to said organic material to increase the responsiveness of said organic material to temperature change.

26. In a thermostat, a fusible crystalline material having one portion thereof operable for motor action and having another portion thereof operable as a phase-change medium such that said other portion when subjected equally with said one portion to variation of sensible heat will act at the predetermined crystallizing temperature of said material to cause transformation of said one portion.

SERGIUS VERNET.